Feb. 2, 1971 G. SCOTT ET AL 3,559,319

ROTATIONAL BODY IDENTIFYING MEANS

Filed Oct. 15, 1968 2 Sheets-Sheet 1

INVENTORS
GRAEME SCOTT
JOSEPH ZELIKOVITZ
BY Curphey & Erickson
PATENT AGENTS

INVENTORS
GRAEME SCOTT
JOSEPH ZELIKOVITZ
BY Curphey & Erickson
PATENT AGENTS

United States Patent Office 3,559,319

Patented Feb. 2, 1971

3,559,319

ROTATIONAL BODY IDENTIFYING MEANS

Graeme Scott, Kanata, Ontario, and Joseph Zelikovitz, Ottawa, Ontario, Canada, assignors, by mesne assignments, to Multiple Access General Computer Corporation, Limited, Don Mills, Ontario, Canada Filed Oct. 15, 1968, Ser. No. 767,634

Int. Cl. G09f *3/02*

U.S. Cl. 40—2.2 2 Claims

ABSTRACT OF THE DISCLOSURE

This invention relates to an article which is to be attached to a rotating body for unique identification thereof. Binary or other coded markings are placed upon an applique base which is applied to the body. The markings are segmental to a circle, and each is of approximately unvarying distance from a point on the axis of rotation of the body. When the body rotates with some speed, any decimal rotation upon the body becomes unreadable, while highly visible rings are produced which can be decoded into a decimal identifying number, unique for the rotating body.

Figure 1:
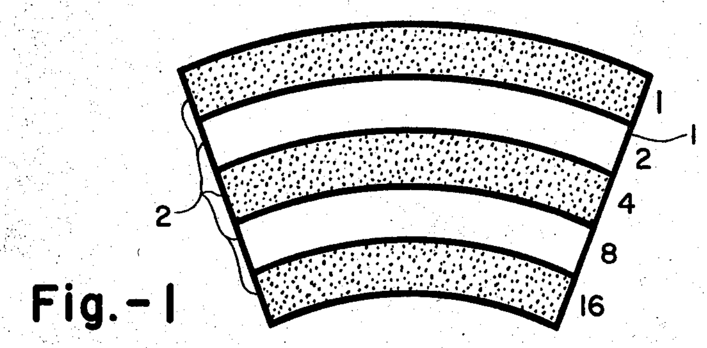

This invention relates to an article which can be applied to a rotating body in order to designate and identify such body according to a predetermined code.

With a rotating body permanently fixed to a piece of machinery, there is usually little problem in later identification thereof, since with the permanent attachment of the parts, a record is usually kept of which parts form the attachment. By example code numbers are often made of record for identification of permanently mounted and suitably identified pulleys, armatures and motors, etc.

However, sometimes rotating parts which are repaced and interchanged frequently must also be identified, and often the interchange is so frequent that accurate record of what part is being used on a particular piece of machinery at a particular time is rendered inaccurate or cannot practically be kept. Often, when the parts rotate at a very fast rate, it is highly desirable to identify them while they are in rotation. Examples of these often interchanged parts are drill bits used in manufacturing, digital computer memory disk packs, etc. In the latter example, to which the construction of this invention was primarily directed, but not limited thereto, concentric layers of magnetically coated disks are resident in a recording-reading machine, with ony the upper surface visible. The packs desirably rotate at an extremely high rate, the faster the rate of rotation, the faster the access to information stored in the magnetic coating.

Often there are 30 or 40 disk packs serving a particular digital computer, while only one or a few are utilized at one time. Consequently, there is frequent manual or automatic interchanging of the disk packs in the recording-reading machines. In order to identify the pack while being used, the machine must be stopped, resulting in downtime. Clearly, a means for identifying the disk packs while in rotation is highly desirable, but until the advent of this invention, has been unavailable.

In the past, rotating bodies have been identified by a decimal number marked upon, etched into the surface thereof, or marked upon a sticker adhered thereto. As soon as the part begins rotation with some speed, the number is completely invisible since the eye cannot follow the number with the required speed. Furthermore, as the number rotates, it follows an angular displacement through 360° which effectively confounds reading.

We have invented an article which can be applied to a rotating body which allows complete and easy identification thereof both during stationary and rotating movements. The speed of rotation has no effect upon the ease of identification, although below certain relatively slow speeds such as 15 revolutions per second, the faster the rotation, the easier the identification. Identification can be effected of rotating disks, of cylindrical surfaces, etc. In order to effect such identification, we have invented an article comprising an applique base which can be applied to and carried upon a rotating body during rotation, with a marking upon said base for identifying said body, the marking being disposed such that during rotation of said body, it follows an approximately unvarying radius from a point on the axis of rotation thereof. The placement of the marking from a base line, for instance the periphery of the applique base, or from the axis of rotation, provides an indication of a predetermined identification code. When applied to a cylindrical surface, the base line can be one or the other end of the applique base, said base being carried in a circle around the axis of rotation.

Figure 2A:
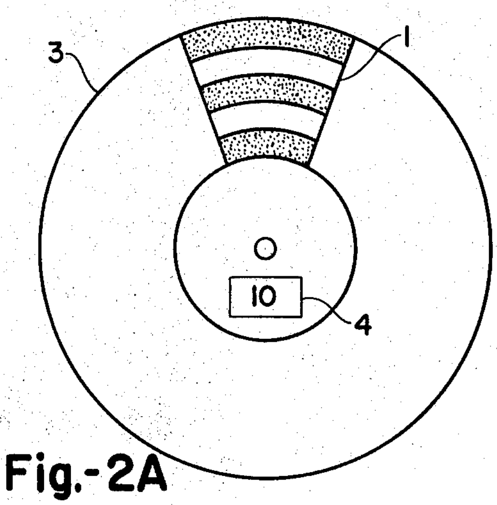
Figure 2B:
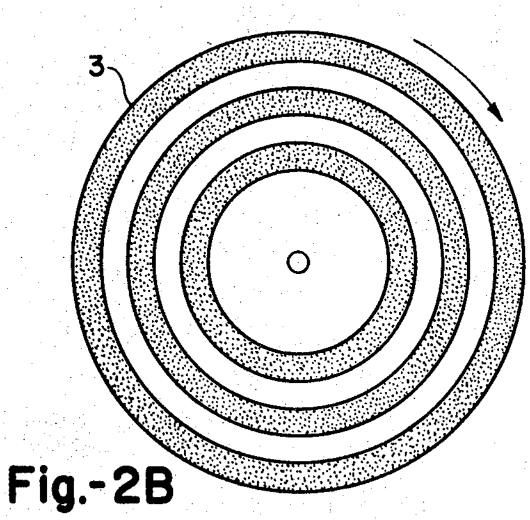
Figure 3A:
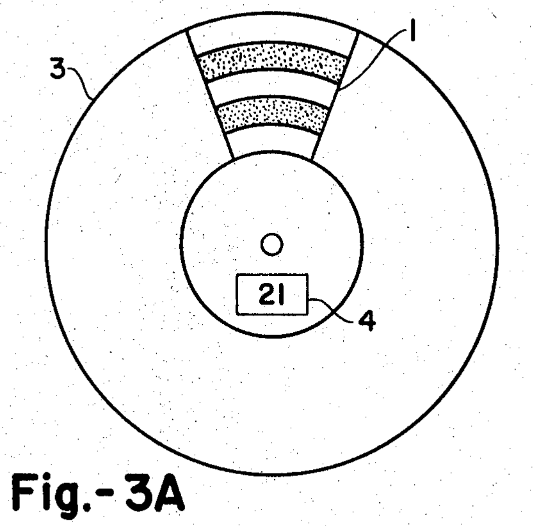
Figure 3B:
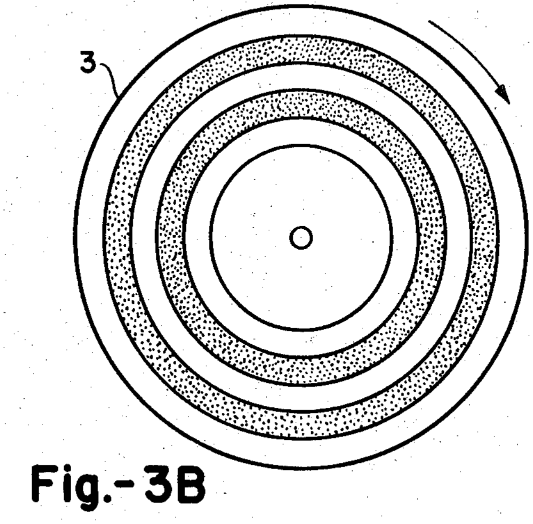
Figure 4:
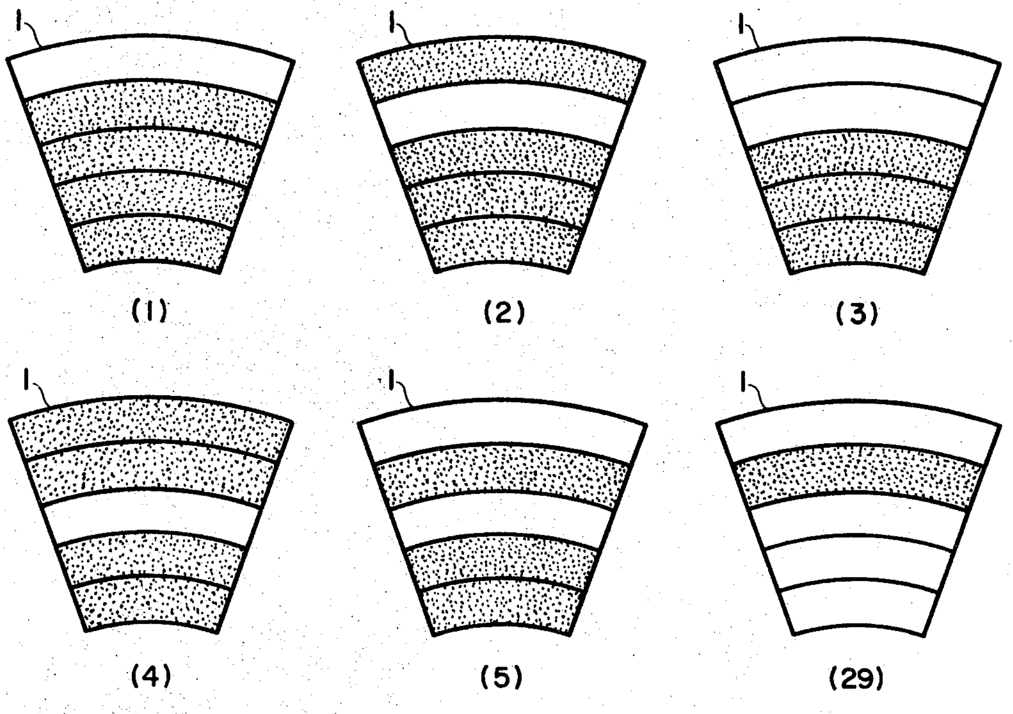
Figure 5A:
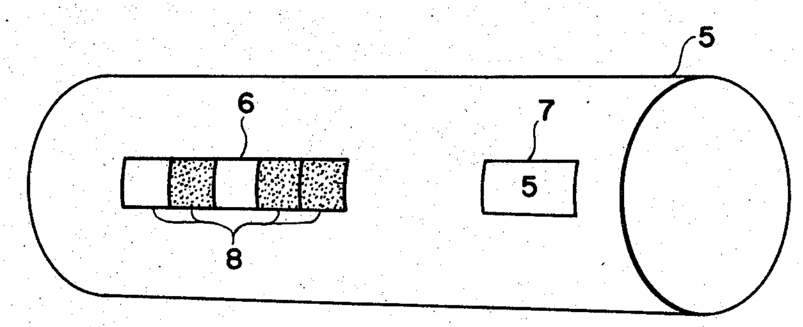
Figure 5B:
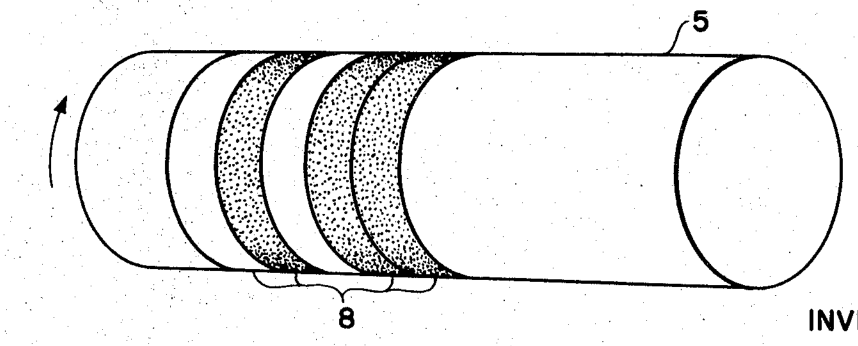

For a more detailed description of the invention, please refer to the following drawings:

FIG. 1 shows an applique base which can be applied to a disk intended to be rotated, FIG. 2A shows the applique base fixed to a disk while the disk is stationary, FIG. 2B shows the same disk as FIG. 2A with the applique fixed to it, during rotation, FIG. 3A shows an applique base designating a different rotating disk, while stationary, FIG. 3B shows the disk of FIG. 3A during rotation, FIG. 4 shows examples of applique disks coded for various numerical designations, FIG. 5A shows an applique base applied to a cylindrical surface, and FIG. 5B shows the cylindrical surface of FIG. 5A during rotation.

Referring now to FIG. 1, an applique base 1 is shown which can be applied to a surface intended to be rotated. In particular, this form is intended to be applied to the surface of a disk shaped surface. The applique base 1 should be of a size which is segmental in area to the disk.

Segmental arcs 2 of predetermined radius from the axis of rotation of the surface to which it is to be attached are marked upon the applique base in order to provide a coding of the disk upon which it is to be applied.

The segmental arcs 2 can be coded in many known codes, for instance, binary, octal, etc. In the preferred embodiment, the arcs are either filled in black or left in the base colour of the applique base, for instance, white, in binary code. Either the black segmental arcs, or the white segmental arcs, can stand for "ones," while the alternate shade will stand for "zeros." In the example described in this disclosure, it will be assumed that the white segmental arcs stand for "ones" and the black segmental arcs (shown dotted) stand for "zeros."

In FIG. 1, beside each of the segmental arcs, have been placed the decimal numbers which positions represent the binary coded numerals of the arcs. An arbitrary base line has been chosen as the outside radius. Therefore, it may be seen that the white segmental arcs have been left in the "8" and "2" positions of binary, standing for the numerical designation "10."

FIG. 2A shows the applique base 1 described with reference to FIG. 1 applied to the surface of a disk 3 of, for instance, a computer memory disk pack. Shown near the center of the disk pack 3 is a conventional identification sticker 4 carrying the decimal number "10" which is the numerical identifier of the disk pack. Obviously, when the disk 3 is stationary, both the sticker 4 and applique base 1 are readable, the sticker in decimal and the applique base in binary.

FIG. 2B shows the disk 3 during rotation. Obviously, the numeral "10" on the sticker 4 is no longer visible, but the binary notation on the applique base has formed highly visible rings on the rotating disk 3. It is obvious that now it is extremely easy to identify the disk simply by counting in binary the designation identified by the white rings.

FIG. 3A shows an applique base 1 applied to another disk 3 but with a different numerical designation than the one shown in FIGS. 1 and 2. In counting the white rings, it will become obvious that the number of the disk is 21, corresponding to the decimal notation applied to sticker 4. FIG. 3B shows the same disk in rotation, and here, as in FIG. 2B, the decimal notation "21" is invisible while the binary notation displayed by the white rings is highly visible.

FIG. 4 shows examples of six applique bases. Where five ring segments are used, up to 32 different applique bases and therefore 32 different disks can be differentiated using binary code. For instance, applique base (1) contains a single white ring segment next to the arbitrary base line which designates the decimal numeral 1, applique base (2) contains a single white segment in the second ring segment signifying "2," applique base (3) contains white ring segments in the two outside positions, signifying "3," applique base (4) has a single white ring in the third position signifying "4," applique base (5) is similar to (4) but carries an extra white ring in the first position signifying "5," and applique base (6) carries white rings in the first, third, fourth and fifth positions signifying in binary the decimal number "29."

Thus is may be seen that with the addition of larger numbers of ring segments, $2^N$ different applique bases and therefore disks, may be identified, where N is the number of ring segments.

FIG. 5A shows a cylindrical surface 5 to which an applique base 6 has been applied. The cylindrical surface is intended to rotate about its axis. In the past, a decimal identification number such as the "5" shown marked on sticker 7 could not be seen during rotation of the cylindrical surface, with the unaided eye.

However, using this invention, the numerical designation of the rotating cylindrical surface can be easily identified. Applique base 6 consists of a rectangular applique, for instance, a sticker, which is divided into segments 8. As described earlier, a base line is chosen, for instance, at the left hand side of the applique base, and segments are marked or shaded in a predetermined code, for instance binary. In the example shown in FIG. 5A, white spaces occupy the first and third segments, indicating in binary the decimal digits "5." The width of the applique base 6 should be segmental to the periphery of the surface, and the length should be sufficient to contain all the markings required for the length of the code chosen. The markings should be approximately linear strips parallel to the surface of rotation of the cylinder to which it is to be applied.

FIG. 5B shows the cylindrical surface of FIG. 5A during rotation. It may be seen that the numeral "5" from sticker 7 has become invisible, while the markings on the applique base have formed rings around the periphery of the cylindrical surface 5, and the binary numerical designation can easily be distinguished.

In order that the boundaries of the segments should be easily visible, such boundaries should be marked around all segments, whether filled in or left blank. In fact, it is preferred that no markings be placed on the applique base except for the boundaries, during manufacture, the user being able to fill in segments according to his own desired code when arranging classification of the disks or cylinders upon which the applique bases are to be applied.

The applique bases are preferably of a form having a base colour which is readily identifiable, such as highly reflective white, and preferably should have an adhesive backing for easy application. However, they may also be inserted in tabs or frames especially disposed on the surfaces of the disks to be marked, for that purpose.

In addition to binary, other forms of codes can also be used, as mentioned above, for instance well known octal coding. Colours, preferably bright ones, can be used as identification codes. The outer ring can be coloured to indicate decimal "tens" and three or four inner segments utilized for units coded in binary. Two segmental arcs can be used, with the outer one designating decimal "tens" by the use of 10 colours, and the inner arc designating decimal units by the use of the same 10 colours. Using three rings in this manner, decimal "thousands" can be indicated. It therefore may be seen that many other forms of coding can be used and will readily come to mind.

The embodiments of the invention in which an exclusive property or privilege is claimed are defined as follows:

1. An article for identifying a computer memory pack comprising a base adapted to be secured to a circular side wall of the computer pack, said base having an outer edge, an inner edge and a pair of side edges, said outer edge being arcuate shaped and having a radius of curvature equal to the radius of the side wall of the computer memory pack to which it is to be applied, the inner edge being arcuate shaped and having a radius of curvature generated from the axis of gyration of said outer edge, said inner edge defining a datum edge, said side edges extending radially from the axis of gyration of said outer edge and being spaced from one another so that said base has an area which is a segment of the area of the side wall of the computer pack, a plurality of markings formed on said base in a predetermined spaced parallel relationship to said arcuate shaped base line, the spacing and the disposition of all said markings from said base line being indicative of a predetermined code, said outer curved edge of said base being alignable with the outer edge of said pack and said inner curved edge of said base being alignable with guide lines formed on the computer pack to locate said base in any position with said markings disposed such that during rotation of the pack they will follow an approximately unvarying radius from the axis of rotation of the pack.

2. An article as defined in claim 1 wherein said applique base is comprised of a flat film having an adhesive back for pressure-initiated adhesion to the surface of said body.

References Cited

UNITED STATES PATENTS

| | | | |
|---|---|---|---|
| 1,984,839 | 12/1934 | Murray | 40—21 |
| 3,128,645 | 4/1964 | Anthony | 40—2.2X |
| 3,251,150 | 5/1966 | Sedgwick et al. | 40—2.2 |

FOREIGN PATENTS

| | | | |
|---|---|---|---|
| 263,568 | 3/1929 | Italy | 46—47 |

JEROME SCHANALL, Primary Examiner

W. J. CONTRERAS, Assistant Examiner